Patented June 17, 1930

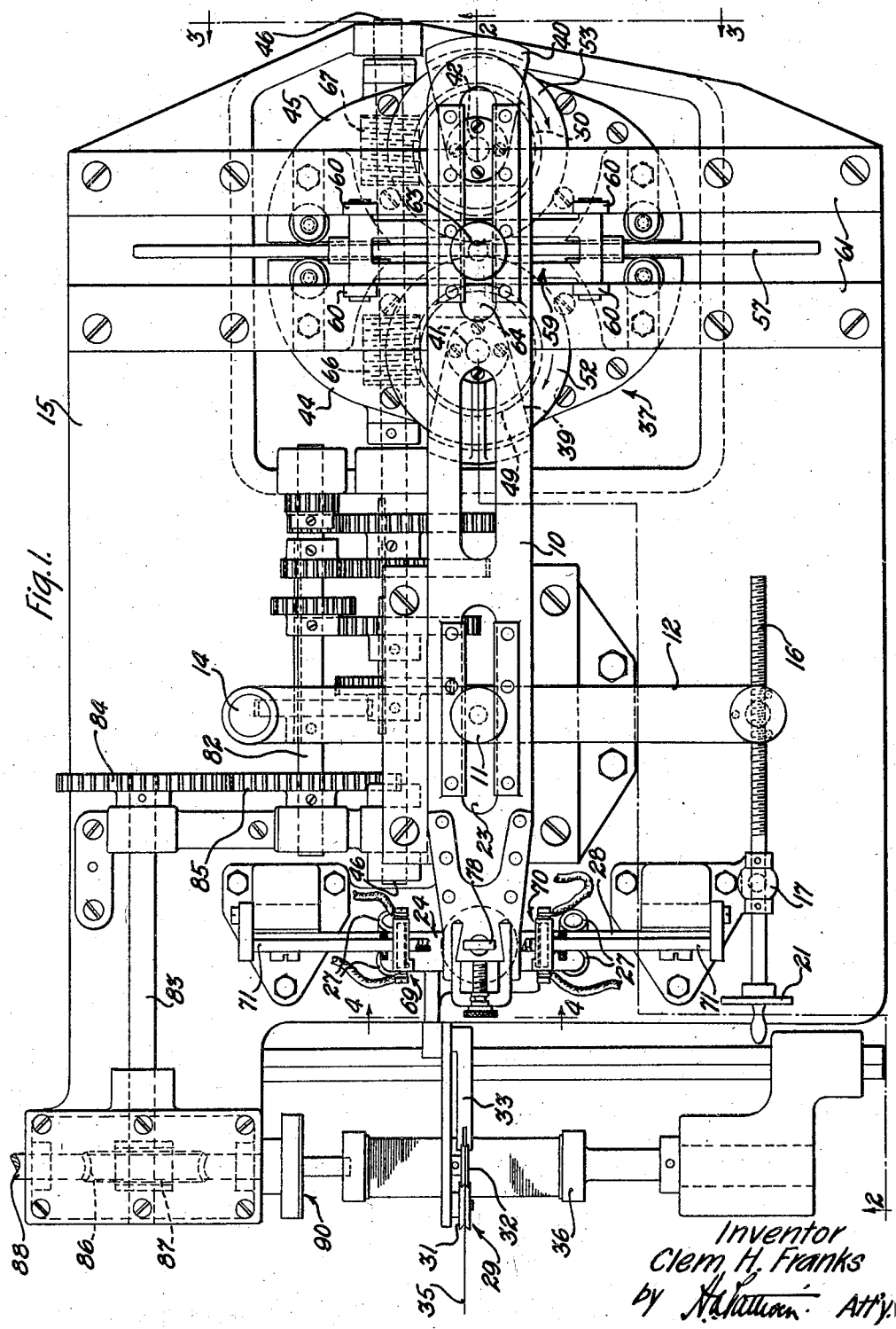

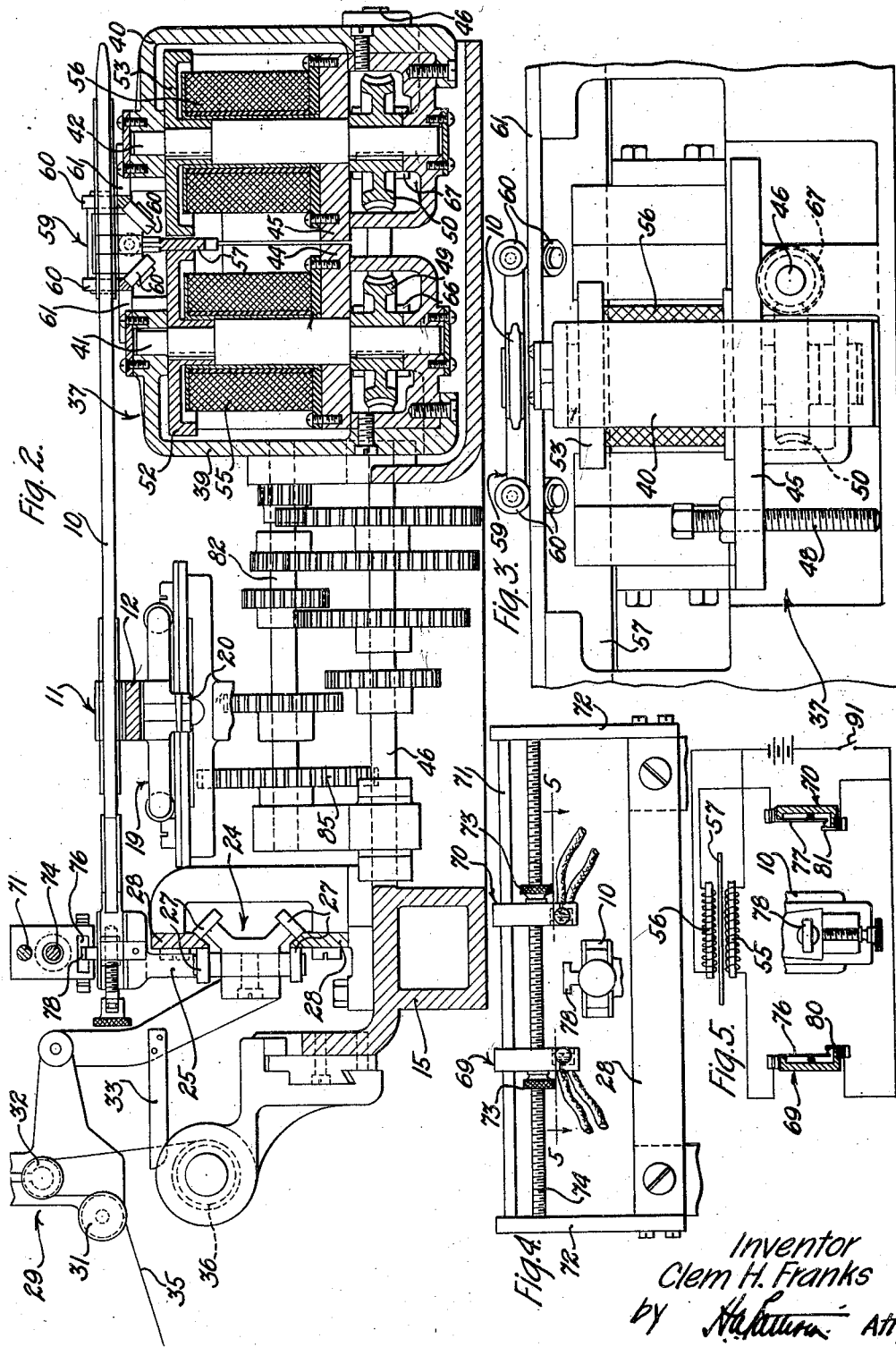

1,764,618

UNITED STATES PATENT OFFICE

CLEM H. FRANKS, OF LA GRANGE, ILLINOIS, ASSIGNOR TO WESTERN ELECTRIC COMPANY, INCORPORATED, OF NEW YORK, N. Y., A CORPORATION OF NEW YORK

STRAND-DISTRIBUTING APPARATUS

Application filed July 14, 1927. Serial No. 205,821.

This invention relates to strand distributing apparatus, and more particularly to strand distributors for coil winding machines.

The primary object of this invention is the provision of a material distributing apparatus which operates to efficiently and uniformly distribute the material and in which its directional movement is controlled electrically.

In accordance with the general features of the invention one embodiment thereof includes a horizontally disposed distributor arm adjustably pivoted intermediate its ends, one end thereof supporting means for directing strand to a rotatable coil spool, the other end having a pivotal connection with a conveyor or carriage which supports an elongated horizontal conveyor member or bar. Magnetic rollers which are continuously rotatable operate to intermittently attract and thereby reciprocate the conveyor member and means are provided for very accurately controlling the speed and extent of travel of the conveyor member.

These and other objects will be apparent from the following detailed description taken in connection with the accompanying drawing, wherein Fig. 1 discloses a plan view of a coil winding apparatus which is representative of one embodiment of the invention;

Fig. 2 is a vertical sectional view taken substantially on the line 2—2 of Fig. 1, the distributor arm at its driven end being shown in elevation to more clearly disclose the structure thereof;

Fig. 3 is a fragmentary end elevational view of the distributor drive mechanism as viewed on the line 3—3 of Fig. 1;

Fig. 4 is a fragmentary elevational view of the forward end of the distributor arm as viewed on the line 4—4 of Fig. 1, and Fig. 5 is a circuit diagram including sectional views of a switch mechanism taken on the line 5—5 of Fig. 4.

Referring now to the drawings wherein like numerals have been employed to designate similar parts throughout the various figures, a horizontally disposed distributor arm 10 (Fig. 1) is pivotally mounted intermediate its ends at 11 upon a support arm 12 extending transversely thereof. One extremity of the support arm 12 is pivotally mounted at 14 upon a machine frame 15 and the other end thereof has a threaded connection with a horizontal adjusting screw 16 slidable within a bearing 17. The support arm 12 is mounted upon a carriage 19 provided with a securing nut 20 (Fig. 2) and it will be clear that when the arm 10 is in motion or at rest a hand wheel 21 (Fig. 1) carried by the adjusting screw 16 may be readily manipulated so as to vary the position of the support arm 12 and thereby correspondingly change the position of the pivoted point 11 within a slot 23 provided in the distributor arm 10.

The forward extremity of the distributor arm 10 to the left (Fig. 1) is connected with a horizontally reciprocable carriage 24 (Fig. 2) through the medium of a depending support member 25, the carriage 24 being provided with suitable friction reducing rollers 27 which engage horizontal guide bars 28 mounted upon the machine frame 15. The carriage 24 supports a strand directing mechanism 29 which includes rollers 31 and 32 and a guide finger 33, these elements serving to direct a strand or wire 35 to a rotatable spool 36 during the oscillation of the distributor arm 10.

The rearward extremity of the distributor arm 10 is associated with a driving mechanism denoted generally by the numeral 37 (Figs. 1 and 2). This driving mechanism 37 includes a pair of frame members 39 and 40 which provide upper and lower bearings for shafts or cores 41 and 42, respectively. Horizontally disposed base members 44 and 45 through which the shafts 41 and 42 extend are pivotally mounted near one end thereof upon a drive shaft 46, the other extremity of each base member being provided with an adjustable stop screw 48 (Fig. 3) which is adapted to vary the position of the bases from the horizontal. The lower ends of the shafts or cores 41 and 42 are provided with worm wheels 49 and 50 while the upper ends thereof support magnetic driving members or rollers 52 and 53 which are adapted to be magnetized when windings 55 and 56 positioned therebeneath are energized.

Extending downwardly between the adjacent portions of the peripheral surfaces of the drive members 52 and 53 is an elongated horizontally disposed conveyor member or bar 57 which is hinged to and forms a part of the underside of a carriage or conveyor 59. This carriage 59 is provided with friction reducing rollers 60 which engage parallel guide plates 61 and the central portion of the carriage carries a pin 63 (Fig. 1) which extends upwardly through and is slidable within a slot 64 provided in the distributor arm 10. Thus, it is to be understood that when the carriage 59 is reciprocated along the guide plates 61, the distributor arm 10 will be rotated about the pivoted point 11 so as to effect the reciprocation of the strand directing mechanism 29 at the forward extremity of the distributor arm.

The magnetic drive members or rollers 52 and 53 are continuously rotated in the same direction by means of the drive shaft 46 which carries a pair of worms 66 and 67 meshing respectively with the worm wheels 49 and 50. Obviously when one of the rotating driving rollers 52 and 53 is magnetized through the action of its companion winding, the conveyor member 57 will be attracted thereto and moved in accordance with the direction of rotation of the attracting roller. It will also be clear that if this driving roller is de-magnetized and its adjacent or companion roller is magnetized, the conveyor member 57 will be attracted to the magnetized roller and moved in an opposite direction. In this manner the conveyor member 57 may be effectively reciprocated so as to cause the reciprocation of the strand directing mechanism 29 at proper predetermined intervals.

Switch mechanisms 69 and 70 are provided at the forward extremity of the distributor arm 10. These switch mechanisms 69 and 70 are slidable upon a guide rod 71 (Fig. 4) extending between a pair of uprights 72 and in order to properly adjust the spaced relation of the switch mechanism a thumb screw 73 carried by each mechanism is threaded upon a shaft 74 parallel with the guide rod 71. The mechanisms 69 and 70 are provided with resilient contact members 76 and 77 which are positioned in the path of travel of a lug 78 mounted upon the forward extremity of the distributor arm 10 as clearly disclosed in Figs. 2, 4 and 5. The contact member 76 is normally maintained in contact with a companion contact 80 and likewise the member 77 is normally maintained in contact with a contact 81. From the circuit diagram disclosed in Fig. 5 it will be apparent that the engagement of member 76 with its companion contact 80 serves to close a circuit containing the winding 55 and the member 77 engaging the contact 81 normally closes a circuit containing the winding 56. Thus, as the lug 78 moves to the left (Fig. 5) and is carried into momentary engagement with the member 76, said member becomes disengaged from the contact 80, thereby rendering the winding 55 momentarily de-energized. At this moment the conveyor member 57 will be attracted away from engagement with the rotating roller 52 to the roller 53 and the member 57 will immediately experience a reversal in the direction of travel. The lug 78 will consequently be moved away from the contact member 76 and toward the contact member 77. Upon the engagement of the lug 78 with the member 77 the winding 56 will momentarily be de-energized and the conveyor bar 57 will be attracted toward the peripheral surface of the roller 52. From the foregoing it will be clear that the positions of the switch mechanism 69 and 70 will determine the extent of reciprocation of the distributing arm 10 and this extent of reciprocation will in turn be governed by the size or width of coil which is to be wound.

The speed with which the distribution of the wire 35 takes place may be adjusted by varying the position of the pivotal point 11 (Fig. 1) with respect to the distributor arm 10 by the manipulation of the hand wheel 21 as already described and the speed of operation may also be controlled by employing proper companion gears carried by the shaft 46 and a shaft 82 parallel therewith which is driven from a drive shaft 83 through gears 84 and 85. One extremity of the shaft 83 carries a worm wheel 86 (Fig. 1) which is driven by a worm 87 mounted upon a main drive shaft 88, this shaft 88 being provided with a spindle 90 at its extremity for operatively engaging one end of the spool 36. The shaft 88 may be connected with any suitable source of power supply (not shown).

In order to produce a coil having the desired degree of perfection, that is, the same number of turns for each layer of winding, it is necessary that the speed of travel of the strand directing mechanism in one direction be identical with its speed of travel in the opposite direction. In order to correct any difference in such speeds which might arise as a result, for example, from slight variations in the diameter of the driving rollers 52 and 53, it is only necessary to adjust the position of either of the base members 44 or 45 (Figs. 2 and 3). For example, if the diameter of the driving member 52 is slightly smaller than the diameter of its companion member 53 the speed of travel of the conveyor member 57 will be slightly less during its contact with the roller 52 than the speed of travel during its contact with the roller 53. By turning the adjusting screw or stop 48 (Fig. 3) so as to slightly incline the base member 45 from the horizontal, the axis of the driving member 53 will be correspondingly inclined which results in a slight degree of slippage between the peripheral surface of the roller 53 and the bar 57 which is caused by a variation in the effective traction between the surfaces. The amount of slippage between the peripheral surface of the driving rollers and the bar 57 will of course be determined by the degree of angular displacement of the axes of the driving members which is occasioned through the manipulation of the adjusting screw 48. By the means just described for controlling the effective traction the speed of travel during opposite strokes of the distributing mechanism 29 may be very accurately controlled and a coil may be produced having the identical same number of turns in each layer of the winding.

In the operation of the apparatus a spool is properly positioned adjacent the spindle 90. The thumb screws 73 of the switch mechanisms 69 and 70 are adjusted in accordance with the width of the winding to be applied to the spool. A combination of gears carried by the shafts 46 and 82 is arranged to produce the desired speed of reciprocation of the distributing arm 10 and if a closer adjustment is required the hand wheel 21 may be manipulated so as to adjust the position of a pivotal point 11 and as already explained this adjustment may be made while the arm 10 is in motion or at rest. The wire 35 is carried into engagement with the spool 36 and rotation is imparted to the drive shaft 88 from any suitable source (not shown). This will cause the rotation of the spool 36 in a direction to receive the wire 35 and the continuous rotation of the driving members or rollers 52 and 53. By closing a switch 91 (Fig. 5) in the circuit containing the windings 55 and 56, the driving rollers become magnetized and upon completion of each driving stroke of the distributing mechanism 39 the driving members will become momentarily and alternatively de-magnetized, thereby causing the distributor arm 10 to be effectively reciprocated. When the desired number of layers have been wound upon the spool 36 it may be replaced by an empty spool and the described winding operation repeated.

Although the invention has herein been described in connection with an apparatus for distributing wire upon a spool, it will be understood that the invention is capable of many other applications and therefore should only be limited by the scope of the appended claims.

What is claimed is:

1. In traversing apparatus, a conveyor mechanism traversing a predetermined path, rotary driving means, electromagnetic means for causing the rotary driving means to directly engage the coveyor mechanism by magnetic attraction and thereby drive the conveyor mechanism, and means for actuating the rotary driving means.

2. In traversing apparatus, a reciprocable conveyor mechanism traversing a predetermined path, rotary driving means for directly engaging the conveyor mechanism by magnetic attraction to drive the conveyor mechanism, electromagnetic means for causing the rotary driving means to directly engage the conveyor mechanism so as to reciprocate the conveyor mechanism, and means for actuating the rotary driving means.

3. In distributing apparatus, a material distributing element for distributing strand material, a reciprocably movable means secured thereto, rotary driving means for directly engaging said reciprocally movable means, and electromagnetic means for causing said means to directly engage said rotary means for effecting its movement.

4. In distributing apparatus, a conveyor mechanism for distributing strand material, oppositely rotatable driving means for alternately directly engaging the conveyor mechanism by magnetic attraction to drive the conveyor mechanism, electromagnetic means for effecting the alternate direct engagement, and means for rotating the driving means.

5. In distributing apparatus, a conveyor mechanism for distributing strand material, a rotatable driving means, a companion rotatable driving means, said means being designed for alternate direct engagement with the conveyor mechanism by magnetic attraction to drive the conveyor mechanism, electromagnetic means for effecting the alternate direct engagement, and means for adjusting the position of the driving means with respect to the conveyor mechanism to vary the traction between the driving means and the conveyor mechanism.

6. In distributing apparatus, a distributing means including a conveyor for distributing strand material upon a rotatable core, electromagnets provided with rotatable core elements designed to magnetically attract and drive the conveyor, circuit connections for the electromagnets, and controlling means for affecting the circuits in accordance with the width of a core to be wound.

7. In distributing apparatus, a distributing means including a conveyor for distributing strand material upon a rotatable core, electromagnets provided with rotatable core elements designed to magnetically attract and drive the conveyor, circuit connections for the electromagnets, a switch mechanism included in said circuit connections, and means carried by the distributing means for operating the switch mechanism.

8. In distributing apparatus, an oscillatory distributor arm for distributing strand material, a conveyor therefor, means for operating the arm including companion electromagnets having rotatable core elements for alternately engaging the conveyor, circuit connections for said electromagnets, and means responsive to the movement of the distributor arm for controlling the circuit.

9. In distributing apparatus, a distributor arm pivoted intermediate its ends for distributing strand material, a conveyor mechanism at one end of the arm, a strand directing means at the opposite end of the arm, an electromagnet having a rotatable core element for engaging the conveyor mechanism, a companion electromagnet having a similarly rotatable core element, circuit connections for said core elements, and means for rotating the core elements.

In witness whereof, I hereunto subscribe my name this 30th day of June, A. D. 1927.

CLEM H. FRANKS.